United States Patent [19]

Tung-Chow

[11] Patent Number: 4,834,446
[45] Date of Patent: May 30, 1989

[54] PACKING AND STORING DEVICE FOR A FLEXIBLE COVER OF A ROAD VEHICLE

[76] Inventor: Siu Tung-Chow, 3/F., Flat A, No. 16 Broadway, Mei Foo Sun Chuen, Kowloon, Hong Kong

[21] Appl. No.: 72,353

[22] Filed: Jul. 13, 1987

[30] Foreign Application Priority Data

Jul. 14, 1986 [GB] United Kingdom ............... 8617093

[51] Int. Cl.$^4$ ............................................. B60J 11/00
[52] U.S. Cl. ..................................... 296/136; 296/98; 160/23.1; 160/238
[58] Field of Search ................. 296/136, 98; 160/238, 160/23.1, 24

[56] References Cited

U.S. PATENT DOCUMENTS

| | | | |
|---|---|---|---|
| 2,688,513 | 9/1954 | Poirier | 296/136 |
| 4,174,134 | 11/1979 | Mathis | 296/136 |
| 4,432,581 | 2/1984 | Guma | 296/136 |
| 4,445,720 | 5/1984 | Leaf et al. | 296/37.12 |

FOREIGN PATENT DOCUMENTS

| | | | |
|---|---|---|---|
| 110622 | 8/1980 | Japan | 296/136 |
| WO85/03911 | 9/1985 | PCT Int'l Appl. | |
| 811313 | 4/1959 | United Kingdom . | |
| 1114344 | 5/1967 | United Kingdom . | |
| 2068863 | 8/1981 | United Kingdom . | |
| 2147862 | 6/1983 | United Kingdom . | |
| 2118115 | 10/1983 | United Kingdom . | |

*Primary Examiner*—Robert R. Song
*Attorney, Agent, or Firm*—Leydig, Voit & Mayer

[57] ABSTRACT

A packing and storing device for a flexible road vehicle cover, comprises a container having an opening through which the cover can be drawn, a drainage gutter in the lower end of the container leading to a drain hole, a rotatable carrier for the cover mounted in the container and a flexible hose connected to the drain hole. Two freely rotatable rollers are provided along opposite edges of the opening. The device is placed in a luggage compartment of a vehicle and the vehicle cover can be drawn into the container, guided by the rollers, by rotating the carrier. Water collecting in the drainage gutter is conveyed to the outside of the vehicle through the hose.

12 Claims, 4 Drawing Sheets

PACKING AND STORING DEVICE FOR A FLEXIBLE COVER OF A ROAD VEHICLE

BACKGROUND OF THE INVENTION

This invention relates to a packing and storing device for a flexible cover of a road vehicle.

It is well known to provide flexible covers, made for example of polyvinylchloride (PVC) or canvas, for covering road vehicles, particularly cars which are regularly left exposed to the elements. It is however both troublesome and time consuming to pack up such covers manually each time the cover is to be removed from the car.

The present invention seeks to provide a device for packing and storing such covers in a convenient manner.

SUMMARY OF THE INVENTION

According to the invention, there is provided a packing and storing device for a flexible cover of a road vehicle, comprising a container box-like designed for accommodation in a luggage compartment of the vehicle and having a bottom wall, the container having an opening through which the cover can be drawn in a folded condition into and out from the container, an elongated drainage gutter in the container below the bottom wall and leading to a drain hole, a rotatable carrier for the cover mounted in the container, means for rotating the rotatable carrier so as in use to draw the cover in a folded condition through said opening and wind it around the carrier, and a flexible hose connected to the drain hole so that water collecting in the drainage gutter can be conveyed to the outside of the vehicle.

The invention will now be more particularly described, by way of example, with reference to the accompanying drawings.

DESCRIPTION OF A PREFERRED EMBODIMENT

Figure 1:
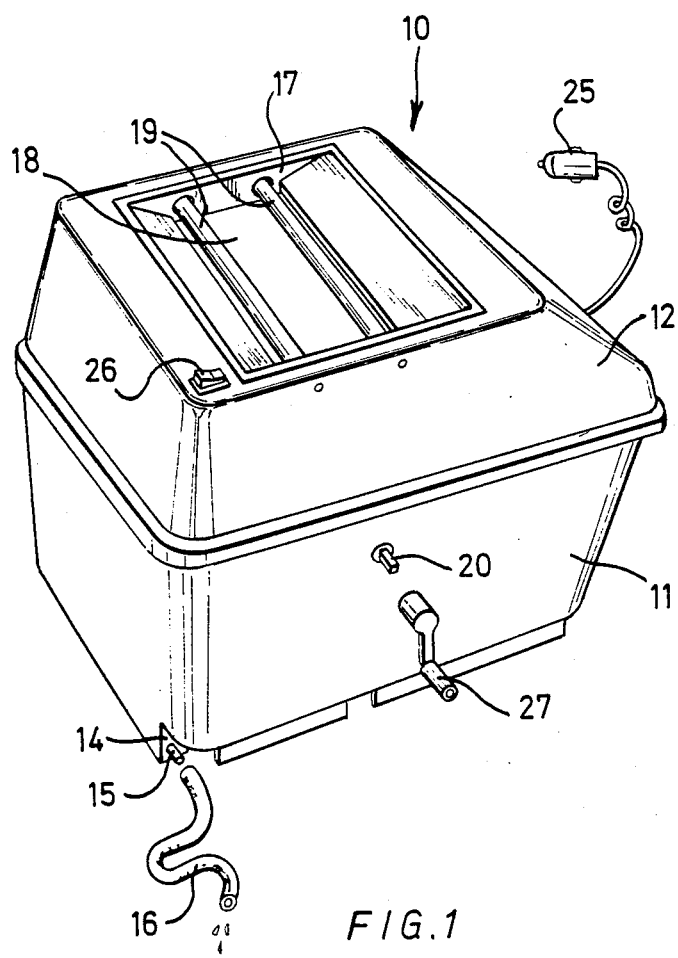
FIG. 1 is a perspective view of one embodiment of a packing and storing device according to the invention.
Figure 2:
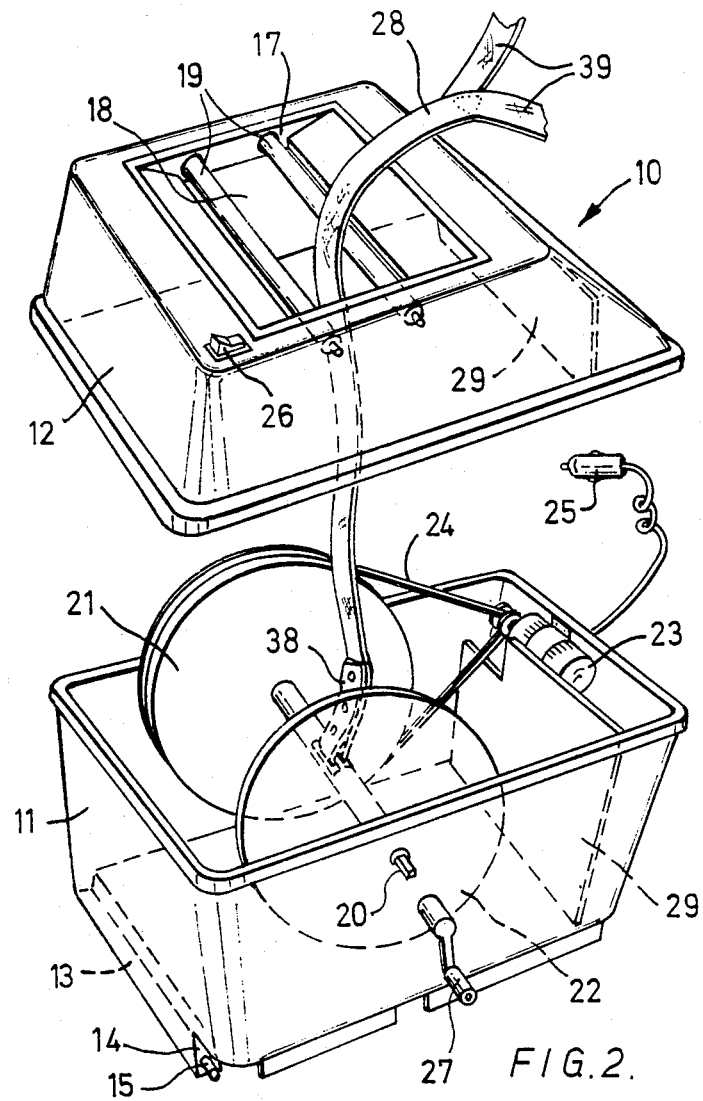
FIG. 2 is a perspective view of the device shown in FIG. 1, with the cover part separated from the body part of the container.
Figure 3:
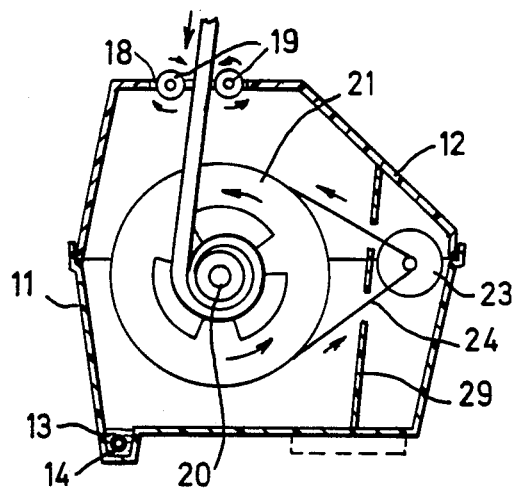
FIG. 3 shows a vertical section through the device, with a flexible cover of a road vehicle partly wound on the rotatable carrier of the device.

Referring firstly to FIGS. 1-3, the packing and storing device shown therein comprises a container 10 having a lower body part 11 and a separable cover part 12. The base of the lower body part is designed such that the container will remain stable when mounted on a flat surface such as on the floor of the luggage compartment of a road vehicle and includes a drainage gutter 13 extending along one edge. The drainage gutter 13 terminates in a drain hole 14 provided in a coupler 15 to which a flexible hose 16 can be connected.

The cover part 12 has a recessed portion 17 in its upper surface and a rectangular opening 18 is provided in the base of the recessed portion 17. Two freely rotatable guide rollers 19 are provided along opposite longitudinal edges of the opening 18 between which rollers a flexible car cover, which may for example be of canvas or PVC, is drawn into and out from the container 10.

A rotatable carrier for the cover, which carrier is in the form of a spindle 20 provided with deeply flanged ends 21 and 22, is mounted transversely in the container 10 between facing walls of the lower body part 11.

The flanged end 21 of the spindle is in the form of a pulley wheel and is rotatably driven by an electric motor, e.g. a small p.m.d.c. motor 23 attached by a bracket to the lower body part 11, via a belt drive 24, the motor drawing power from the car battery via a lead 25 which can be plugged into a cigar socket in the interior of the car.

Figure 5:
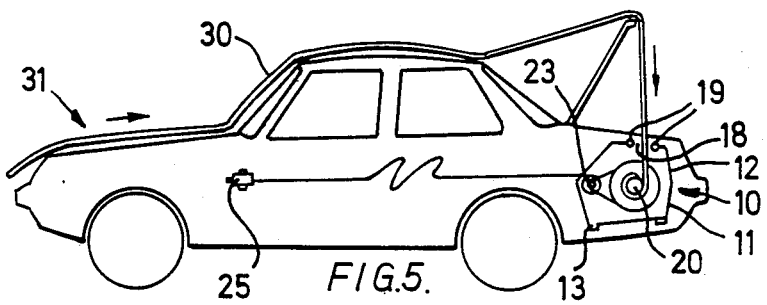
Figure 6:
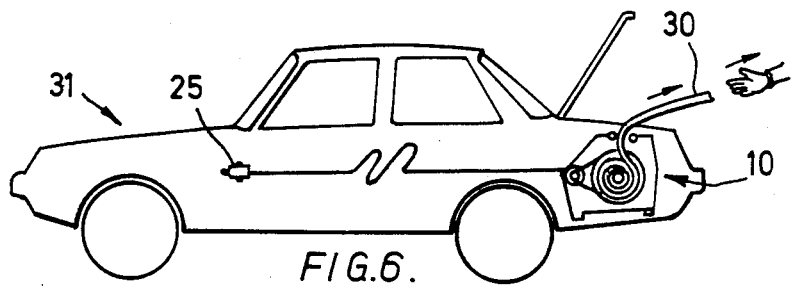
FIG. 6 illustrates the manner in which the cover can be removed from the device.
Figure 9:
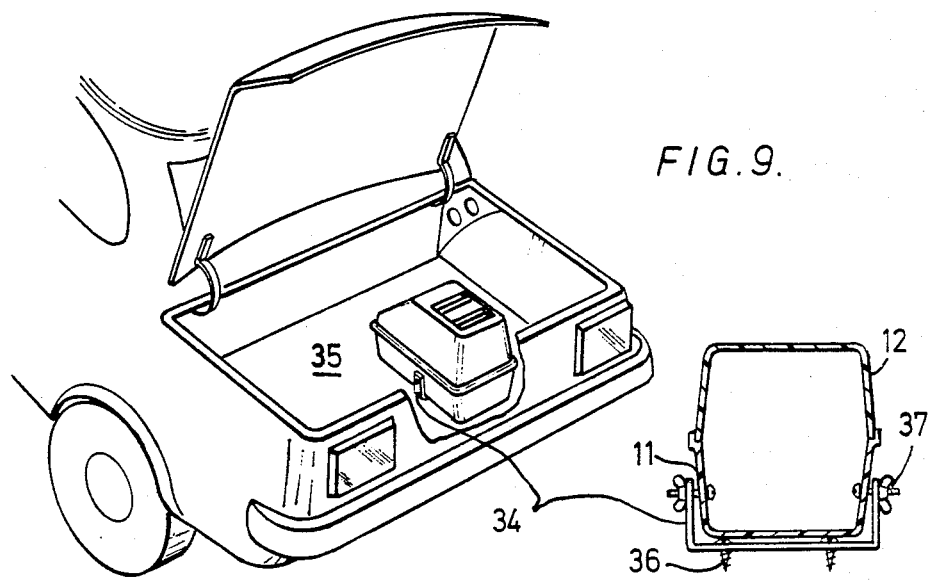
FIG. 9 shows an arrangement for mounting the device in a car luggage compartment.

The device is mounted on the floor of the luggage compartment of a car as shown in FIGS. 5, 6 and 9 is secured in place by a bracket 34 which is attached to a floorpan 35 of the luggage compartment by screws 36, the lower body part 11 being releasably attached to the bracket 34 by screws and and wingnuts 37.

Figure 4:
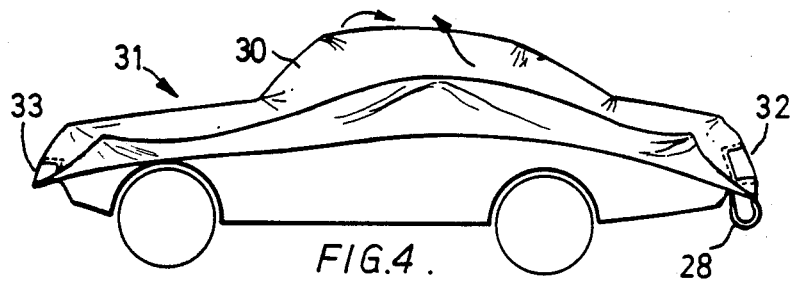
FIGS. 4 and 5 illustrate a method by which a flexible cover of a road vehicle is packed into the device, the device being accommodated in the luggage compartment of the vehicle.
Figure 8:
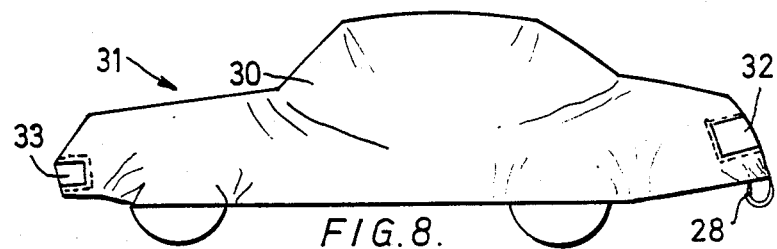
FIG. 8 illustrates features of a vehicle cover used with the device.

In order to pack a flexible cover 30 fitted over a car 31, the cover is first folded to form an elongate bundle extending over the longitudinal extent of the car, the first of a number of such folds being shown in FIG. 4 (cf. FIG. 8). The lid of the car's luggage compartment is then opened. The rear end of the folded cover 30 is connected to spindle 20 by a belt 28 which passes through the opening 18 in the cover part 12 of the device. Belt 28 is releasably attached to the spindle 20 using a rivet and eye type fastening 38. Belt 28 is forked at its free end 39 (see FIG. 2) and attached to the cover 30 at two points spaced by the width of the spindle 20.

The motor 23 is energised by depressing a switch button 26 provided in the cover part 12 and the belt 28 and subsequently the folded cover 30 is drawn into the container 10 (see FIG. 5) and wound onto the spindle 20. Any water collected in the container 10 from the cover 30 flows into the gutter 13 and is carried away by the hose 16.

In order to remove the cover from the container 10, it is simply drawn out manually as shown in FIG. 6.

Figure 7:
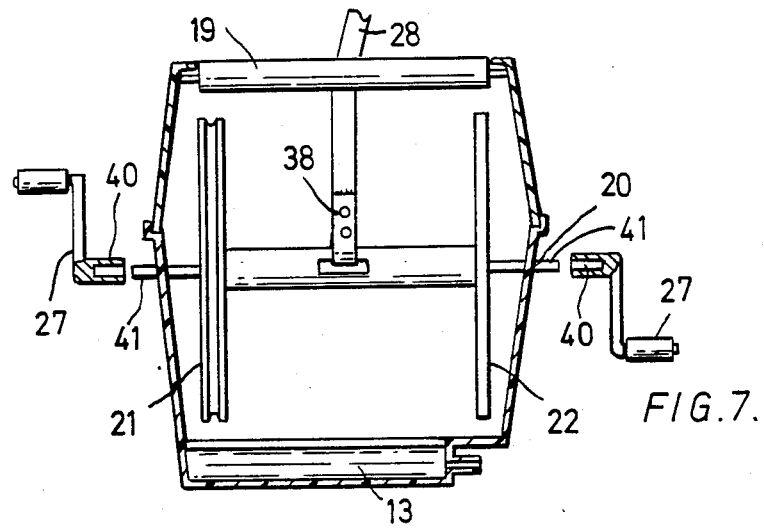
FIG. 7 is a transverse cross-section through the device.

A pair of cranked handles 27 are provided with the device and have square sockets 40 for receiving square ends 41 of the spindle 20 (see FIG. 7). The cover can thus be rolled up manually on the spindle 20. This may be desirable or necessary if the vehicle battery is flat.

FIG. 2 shows a partition 29 which is in two parts fixed in the lower body part 11 and cover part 12 and protects the motor 23 from the belt 28 and cover 30 as they are wound onto the spindle 20.

The above embodiment is given by way of example only and various modifications will be apparent to persons skilled in the art without departing from the scope of the invention.

I claim:

1. A packing and storing device for a flexible cover of a road vehicle, comprising a box-like container designed for accommodation in a luggage compartment of the vehicle, the container having an opening through which the cover can be drawn in a folded condition into and out from the container, said container having a bottom wall, an elongated drainage gutter in the container below said bottom wall, said drainage gutter leading to a drain hole, a rotatable carrier for the cover mounted in the container, means for rotating the rotatable carrier so as in use to draw the cover in a folded condition through said opening and wind it around the carrier, and a flexible hose connected to the drain hole so that water collecting in the drainage gutter can be conveyed to the outside of the vehicle.

2. The device of claim 1, wherein the rotating means is power driven.

3. The device of claim 1, wherein the container has a base designed such that the container will remain stable when mounted on a flat surface and the opening is provided at the upper end of the container.

4. The device of claim 1, further including means for guiding the cover through said opening in the container.

5. The device of claim 4, wherein the guide means comprises two freely rotatable rollers provided along opposite edges of the opening in the container.

6. The device of claim 2, wherein the power driven means is an electric motor.

7. The device of claim 6, wherein the motor is mounted in the container and a drive belt drivably connects the motor to the rotatable carrier.

8. The device of claim 7, further including a lead by which the motor can be connected to the battery of the vehicle.

9. The device of claim 1, wherein the rotatable carrier has flanged ends.

10. The device of claim 7, wherein the rotatable carrier has flanged ends and one of the flanged ends is in the form of a pulley wheel.

11. The device of claim 1, wherein the container comprises two separable parts.

12. The device of claim 1, wherein the cover is transparent at least in a region normally covering number plates of the vehicle.

* * * * *

UNITED STATES PATENT AND TRADEMARK OFFICE
CERTIFICATE OF CORRECTION

PATENT NO. : 4,834,446
DATED : May 30, 1989
INVENTOR(S) : Siu Tung-Chow

It is certified that error appears in the above—identified patent and that said Letters Patent is hereby corrected as shown below:

On the title page, Item [30], the following should be deleted:

[30] Foreign Application Priority Data
   July 14, 1986 [GB] United Kingdom ..... 8617093

Signed and Sealed this

Eighth Day of October, 1991

*Attest:*

HARRY F. MANBECK, JR.

*Attesting Officer*   *Commissioner of Patents and Trademarks*